United States Patent
Shemesh et al.

(10) Patent No.: US 6,782,847 B1
(45) Date of Patent: Aug. 31, 2004

(54) AUTOMATED SURVEILLANCE MONITOR OF NON-HUMANS IN REAL TIME

(76) Inventors: David Shemesh, Meshek 10, Kfar Varburg 70998 (IL); Dan Forman, Moshav Bitzaron (IL)

( * ) Notice: Subject to any disclaimer, the term of this patent is extended or adjusted under 35 U.S.C. 154(b) by 0 days.

(21) Appl. No.: 10/465,393

(22) Filed: Jun. 18, 2003

(51) Int. Cl.$^7$ .............................................. A01K 15/02
(52) U.S. Cl. ......................... 119/718; 119/859; 119/905
(58) Field of Search ................. 119/718, 858, 119/859, 908, 905; 54/71; 455/500, 507

(56) References Cited

U.S. PATENT DOCUMENTS

| | | | |
|---|---|---|---|
| 4,131,887 A | 12/1978 | Birkenhead | 340/566 |
| 4,627,385 A | 12/1986 | Vinci | |
| 4,765,276 A * | 8/1988 | Kime | 54/71 |
| 5,601,054 A | 2/1997 | So | 119/718 |
| 5,927,233 A | 7/1999 | Mainini et al. | 119/718 |
| 6,310,553 B1 * | 10/2001 | Dance | 119/718 |
| 6,431,121 B1 * | 8/2002 | Mainini et al. | 119/718 |
| 6,439,162 B1 * | 8/2002 | van den Berg | 119/908 |
| 6,441,778 B1 * | 8/2002 | Durst et al. | 119/859 |
| 2003/0079695 A1 * | 5/2003 | Kerrigan | 119/858 |

* cited by examiner

Primary Examiner—Charles T. Jordan
Assistant Examiner—Elizabeth Shaw
(74) Attorney, Agent, or Firm—Abelman, Frayne & Schwab

(57) ABSTRACT

A system for non human animal-based surveillance including a non-human animal-borne, non-human animal noise sensor, and a non-human animal noise analyzer operative to receive sensed non-human animal noises, to determine at least partially therefrom whether an alarm situation exists and to provide an alarm indication output.

31 Claims, 5 Drawing Sheets

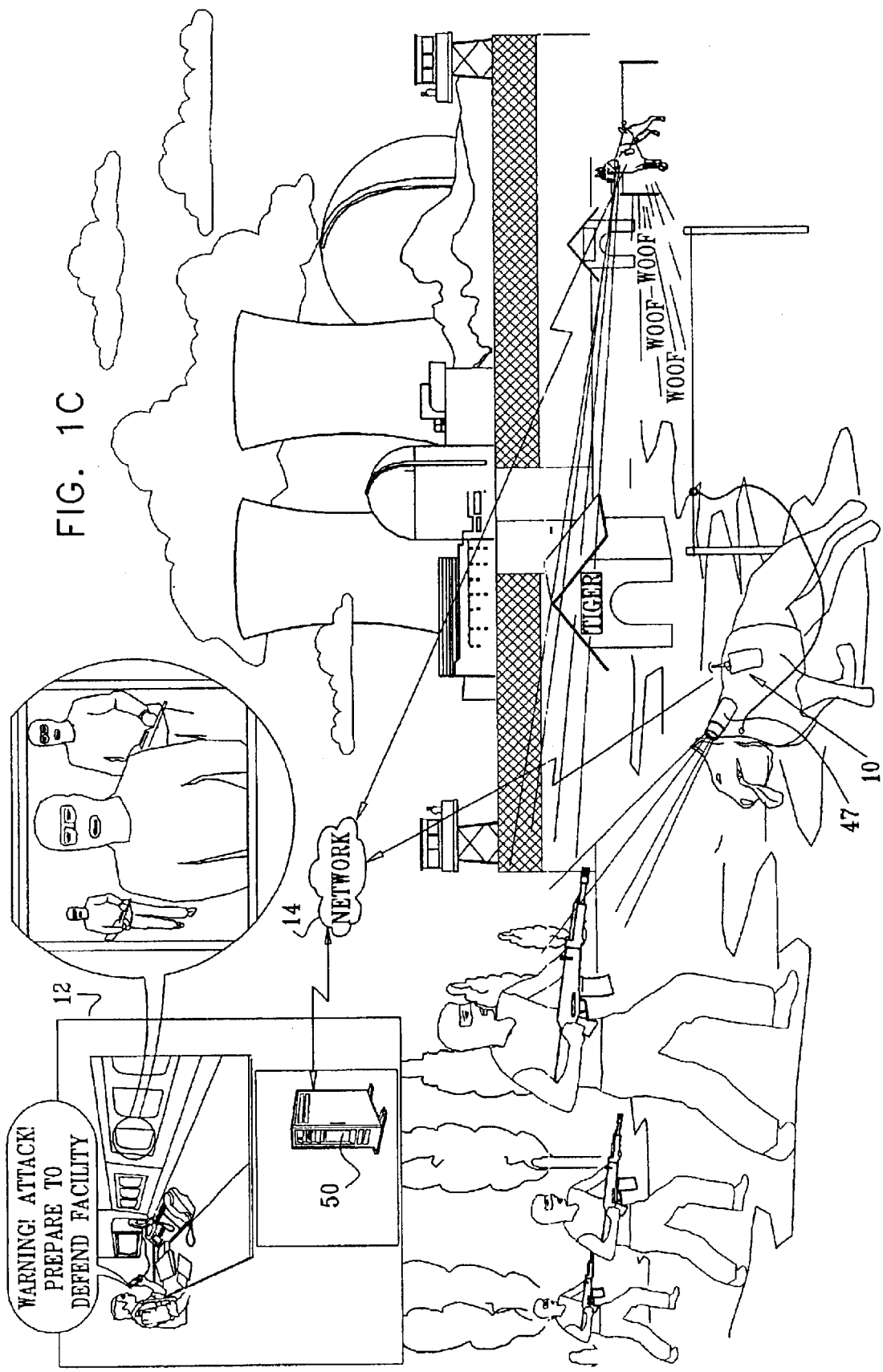

AUTOMATED SURVEILLANCE MONITOR OF NON-HUMANS IN REAL TIME

FIELD OF THE INVENTION

The present invention seeks to provide apparatus, a system and methodology for automated surveillance employing non-human monitors in real time.

BACKGROUND OF THE INVENTION

The following U.S. Patents relate generally to the field of the invention: U.S. Pat. Nos. 5,927,233; 5,601,054; 4,627,385 and 4,131,887.

SUMMARY OF THE INVENTION

The present invention seeks to provide improved apparatus, a system and methodology for automated surveillance employing non-human monitors.

There is thus provided in accordance with a preferred embodiment of the present invention a system for non-human animal-based surveillance including a non-human animal-borne, non-human animal noise sensor, and a non-human animal noise analyzer operative to receive sensed non-human animal noises, to determine at least partially therefrom whether an alarm situation exists and to provide an alarm indication output.

Preferably, the system also includes a remote monitoring facility receiving the alarm indication output. Additionally, the system also includes a non-human animal-borne camera. Additionally or alternatively the non-human animal noise analyzer is non-human animal-borne.

In accordance with another preferred embodiment of the present invention the system also includes a non-human animal-borne wireless transceiver. Preferably, the non-human animal-borne wireless transceiver transmits the alarm indication output to the remote monitoring facility. Additionally, the non-human animal noise analyzer is operative in a sleep mode in the absence of non-human animal sounds meeting a wake-up threshold. Alternatively, the non-human animal noise analyzer is located at the remote monitoring facility.

In accordance with yet another preferred embodiment of the present invention the non-human animal-borne wireless transceiver transmits sensed non-human animal sounds to the non-human animal noise analyzer at the remote monitoring facility. Alternatively or additionally the camera is actuated in response to an output of the non-human animal noise analyzer.

Additionally, outputs of the camera are displayed at the remote monitoring facility. Preferably, the system also includes a non-human animal vital signs sensor for providing a non-human animal vital signs output. Additionally, the non-human animal vital signs output indicates the existence of an alarm situation.

In accordance with still another preferred embodiment of the present invention the system also includes a non-human animal stimulator for providing an operator triggered stimulus to a non-human animal. Preferably, the system includes a non-human animal-borne portion and a remote monitoring facility and utilizes an at least partially wireless network for providing communication between the non-human animal-borne portion and the remote monitoring facility.

Additionally, the non-human animal is a dog and the non-human animal sounds are sounds of dog barking, at least one of whose frequency and amplitude indicates the existence of an alarm situation.

There is also provided in accordance with another preferred embodiment of the present invention a method for non-human animal-based surveillance including sensing a non-human animal noise, using a non-human animal-borne sensor, receiving the non-human animal noise, analyzing the non-human animal noise to determine at least partially therefrom whether an alarm situation exists, and providing an alarm indication output. Preferably, the method also includes transmitting the alarm indication output to a remote monitoring facility.

Additionally, the analyzing the non-human animal noise includes analyzing the non-human animal noise using a non-human animal-borne noise analyzer. Additionally, the transmitting includes transmitting from a non-human animal-borne wireless transceiver. Alternatively or additionally the method also includes operating the noise analyzer in a sleep mode in the absence of non-human animal sounds meeting a wake-up threshold.

In accordance with yet another preferred embodiment of the present invention the method includes analyzing at the remote monitoring facility. Preferably, the method also includes transmitting sensed non-human animal sounds from a non-human animal-borne wireless transceiver to the remote monitoring facility. Additionally, the method also includes actuating a camera in response to the output of the analyzing the non-human animal noise. Alternatively or additionally the method also includes displaying outputs of the camera at the remote monitoring facility.

In accordance with still another preferred embodiment of the present invention the method also includes providing a non-human animal vital signs output. Preferably, the method also includes indicating the existence of an alarm situation based on the non-human animal vital signs output.

Additionally the method also including providing an operator triggered stimulus to a non-human animal. Alternatively or additionally, the method also includes utilizing an at least partially wireless network for providing communication between the non-human animal and the remote monitoring facility. Preferably, the non-human animal is a dog and the non-human animal sounds are sounds of dog barking, at least one of whose frequency and amplitude indicates the existence of an alarm situation.

BRIEF DESCRIPTION OF THE DRAWINGS

The present invention will be understood and appreciated more fully from the following detailed description, taken in conjunction with the drawing in which:

FIGS. 1A, 1B & 1C are simplified pictorial illustrations of a system for automated surveillance employing non-human monitors constructed and operative in accordance with a preferred embodiment of the present invention;

DETAILED DESCRIPTION OF PREFERRED EMBODIMENT

Figure 1A:
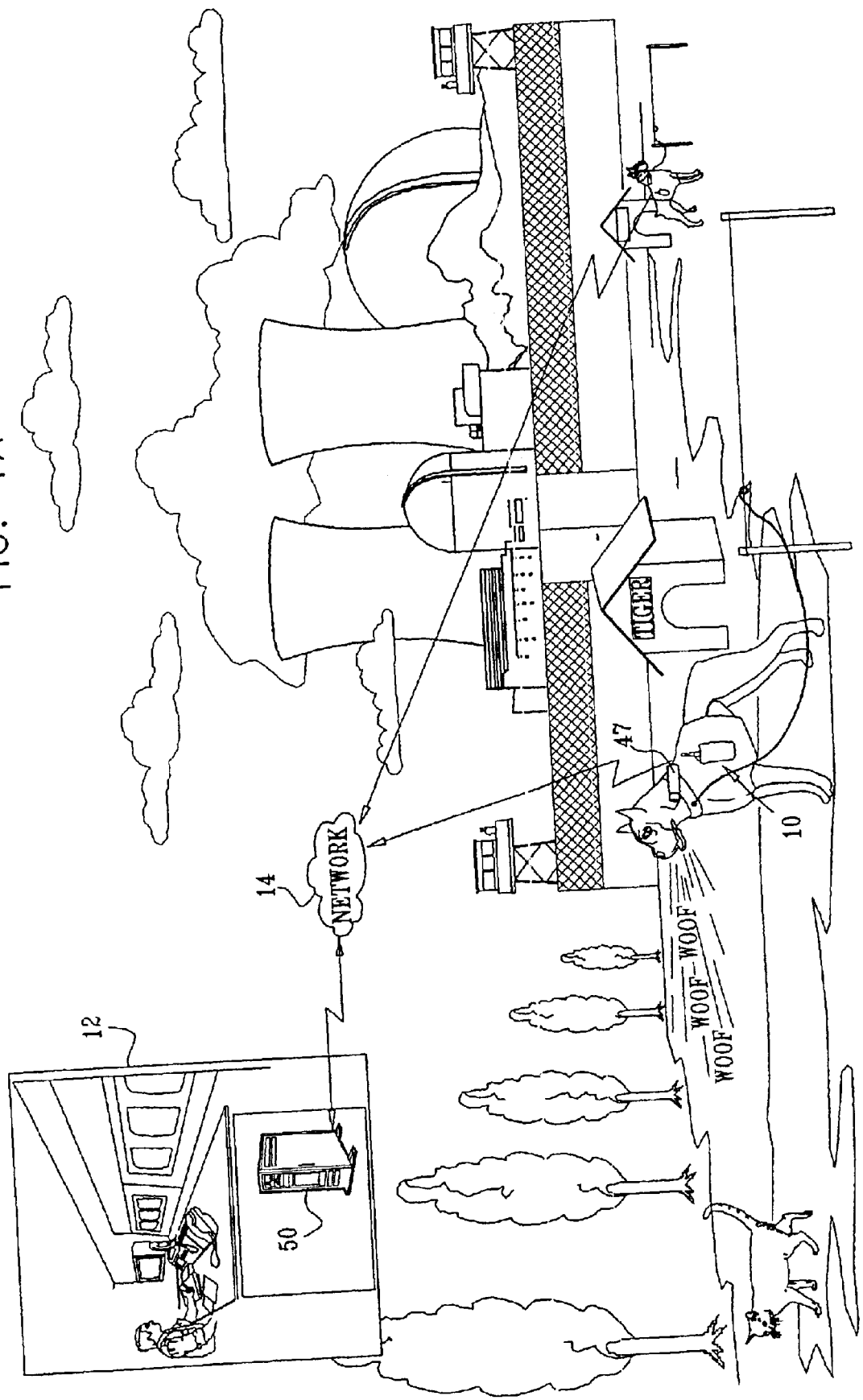
Figure 1B:
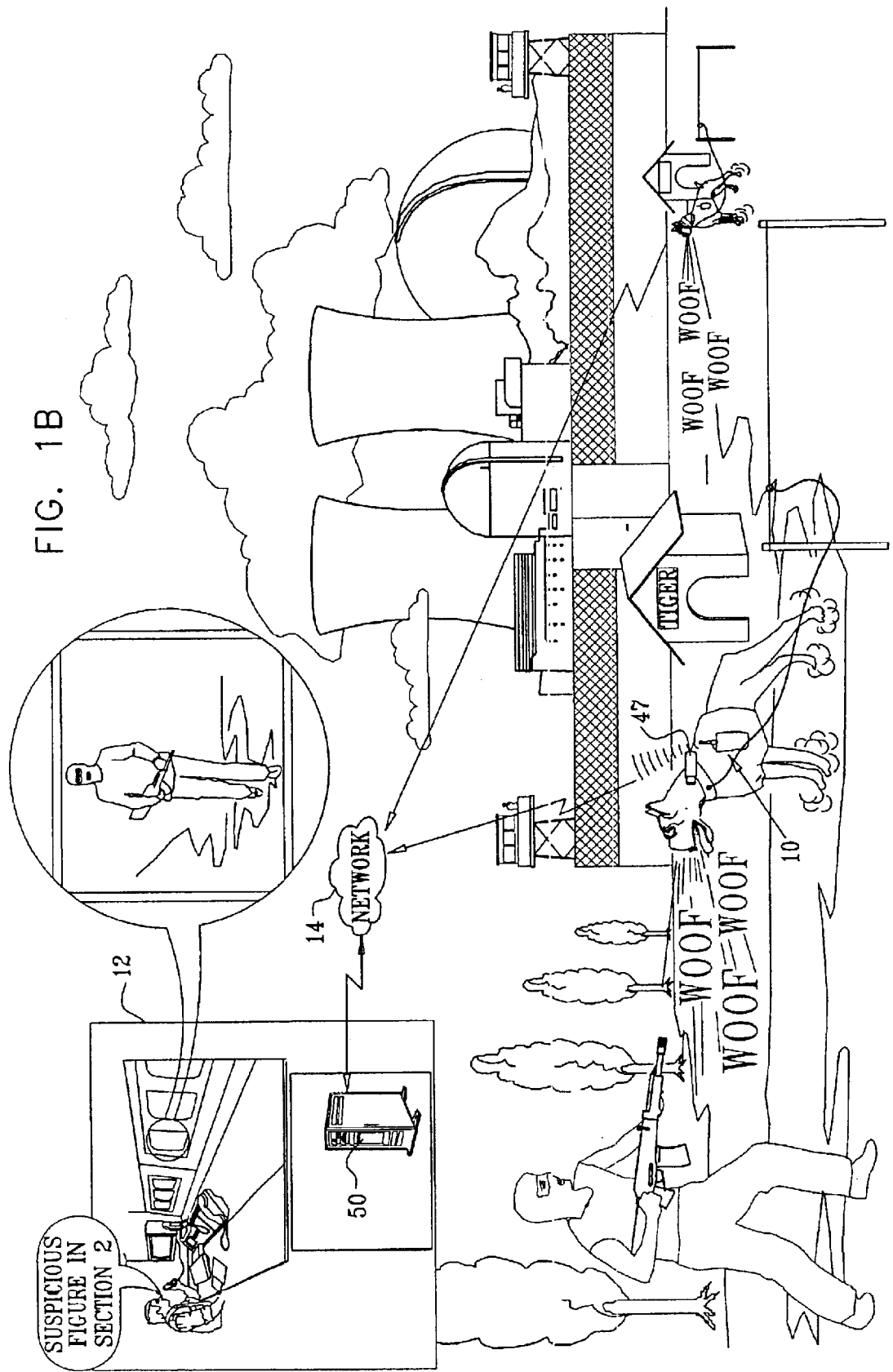

Reference is now made to FIGS. 1A, 1B & 1C, which are simplified pictorial illustrations of a system for automated surveillance employing non-human monitors constructed and operative in accordance with a preferred embodiment of the present invention. FIG. 1A illustrates surveillance apparatus 10, mounted on a guard dog, which communicates with a monitoring station 12, preferably via a wireless network 14.

Figure 2A:
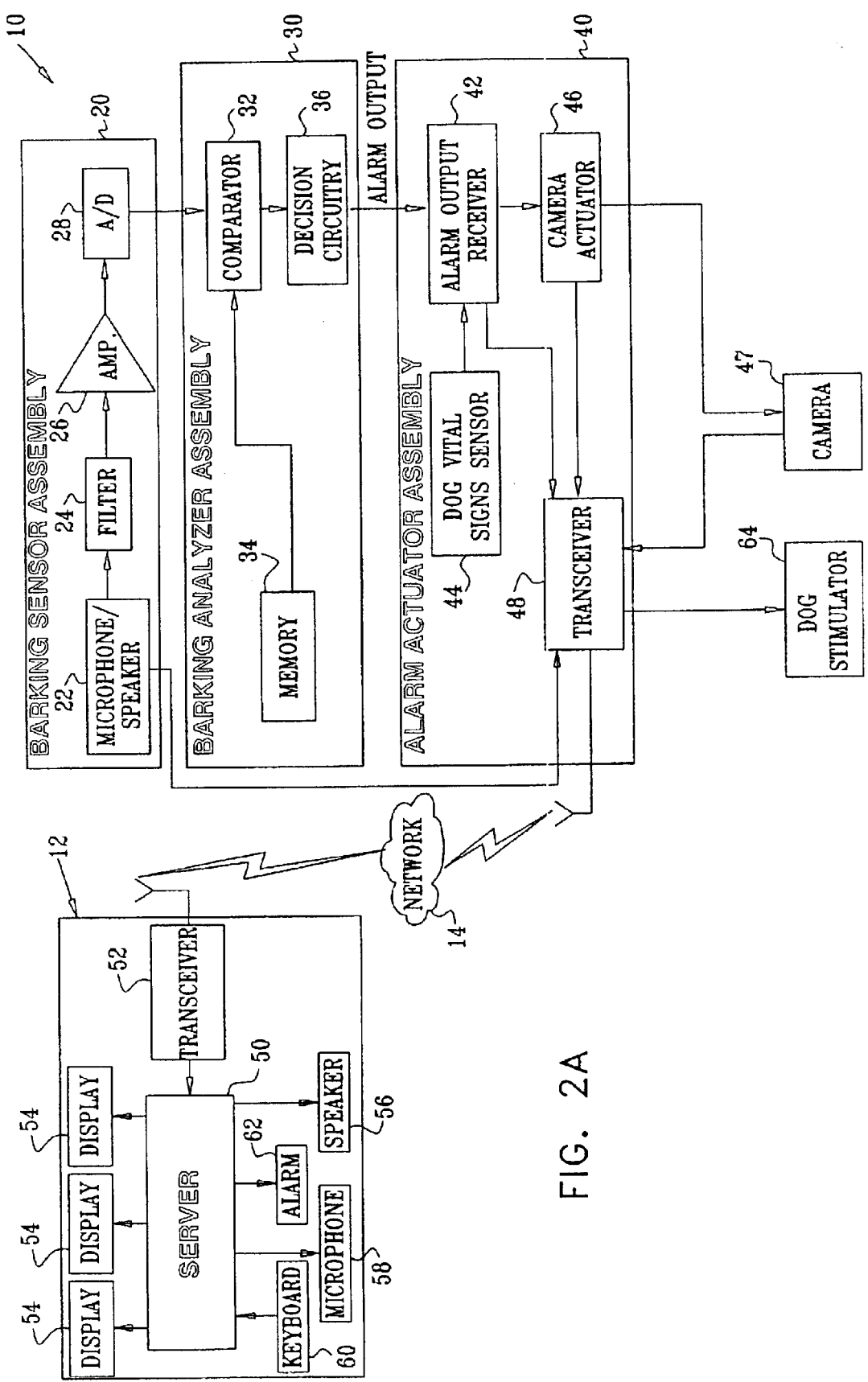
FIG. 2A is a simplified block diagram of the system of FIGS. 1A, 1B and 1C, constructed and operative in accordance with one embodiment of the present invention.

Turning additionally to FIG. 2A, it is seen that the surveillance apparatus 10 preferably comprises a barking sensor assembly 20, typically comprising a microphone/speaker 22, which outputs via a filter 24 to an amplifier 26 and thence preferably to a analog to digital converter 28. Barking sensor preferably is operative to sense sound in the frequency range of 10–90 KHZ. A barking analyzer assembly 30 preferably receives an output from the barking sensor assembly 20 and compares it with stored barking patterns characteristic of the dog when in an alarm state.

Barking analyzer assembly 30 preferably comprises digital comparison circuitry, here indicated as comparator 32, which compares multiple samples of barking sound outputs from barking sensor assembly 20 with the barking sound patterns characteristic of an alarm situation, stored in a memory 34 and digital decision circuitry 36 which analyzes the result of the comparison and provides an alarm output when at least a predetermined number of samples meet an alarm criteria, preferably by virtue of being matched with stored amplitude and frequency patterns known to be characteristic of barking of the dog when in a threatening situation.

It is appreciated that in a preferred embodiment of the present invention, the alarm criteria are individual dog specific and require recording of barks of each specific dog in a learning/training mode. Alternatively, alarm criteria which are not individual dog specific may be employed. As a further alternative, alarm criteria may be provided for animals other than dogs, such as cats or other animals.

An alarm actuator assembly 40 preferably comprises an alarm output receiver 42, which preferably receives an alarm output from barking analyzer assembly 30. Alarm actuator assembly 40 may also receive an alarm output from a dog vital signs sensor 44, such as heartbeat sensor, which could indicate that the dog is in a state of extreme agitation or dead.

The alarm output receiver 42 preferably outputs to a camera actuator 46 which, in an alarm situation, actuates a video camera 47, also mounted on the dog, and employs a transceiver 48 to wirelessly send an alarm output signal to a remote monitoring station 12 (FIG. 1A).

The remote monitoring station 12 preferably comprises, in addition to at least one server 50, a transceiver 52, which communicates with transceiver 48 and receives the output of the barking sensor assembly 20.

One or more video displays 54 showing a scene as imaged by video camera 47 as well as communication apparatus, typically including at least one speaker 56, at least one microphone 58 and at least one keyboard 60, enable personnel at the remote monitoring station to speak or send messages to persons at a site protected by the system of the present invention, as illustrated in FIG. IB and FIG. 1C. The remote monitoring station 12 also preferably includes an alarm annunciator 62, which may operate in an audio, visual or combined audio-visual mode, for indicating the existence of an alarm situation to personnel at the remote monitoring station.

In accordance with an embodiment of the present invention, the remote monitoring station 12 includes functionality for enabling personnel at the remote monitoring station to send messages to the dog via the wireless network 14 and the transceivers 48 and 52. Such messages may be voice messages, playable through microphone 58, or electrical stimulation, which may be provided to the dog by one or more transducers, here termed a dog stimulator 64.

In accordance with the illustrated embodiment of the present invention, one or more and preferably most of the active dog mounted elements shown in FIG. 2A preferably normally operate in a sleep mode, thus conserving battery energy, until a signal, whose amplitude exceeds a predetermined threshold is received, upon which the circuitry becomes active.

Communication between transceiver 48 and the remote monitoring station 12 may be effected through any suitable wireless network 14, such as a cellular telephone network, using voice or SMS messaging for example, or via a wireless computer network, which may include the Internet.

Returning to FIGS. 1A–1C, it is seen that FIG. 1B illustrates a situation wherein the amplitude and perhaps also the frequency of the barking of a dog indicates an alarm situation. FIG. 1C illustrates a situation where a dog has been killed by an intruder, also indicating an alarm situation. In both cases, the video camera 47 provides images from the scene to the remote monitoring station 12 and the operator at the monitoring station provides instructions to on-site personnel.

Figure 2B:
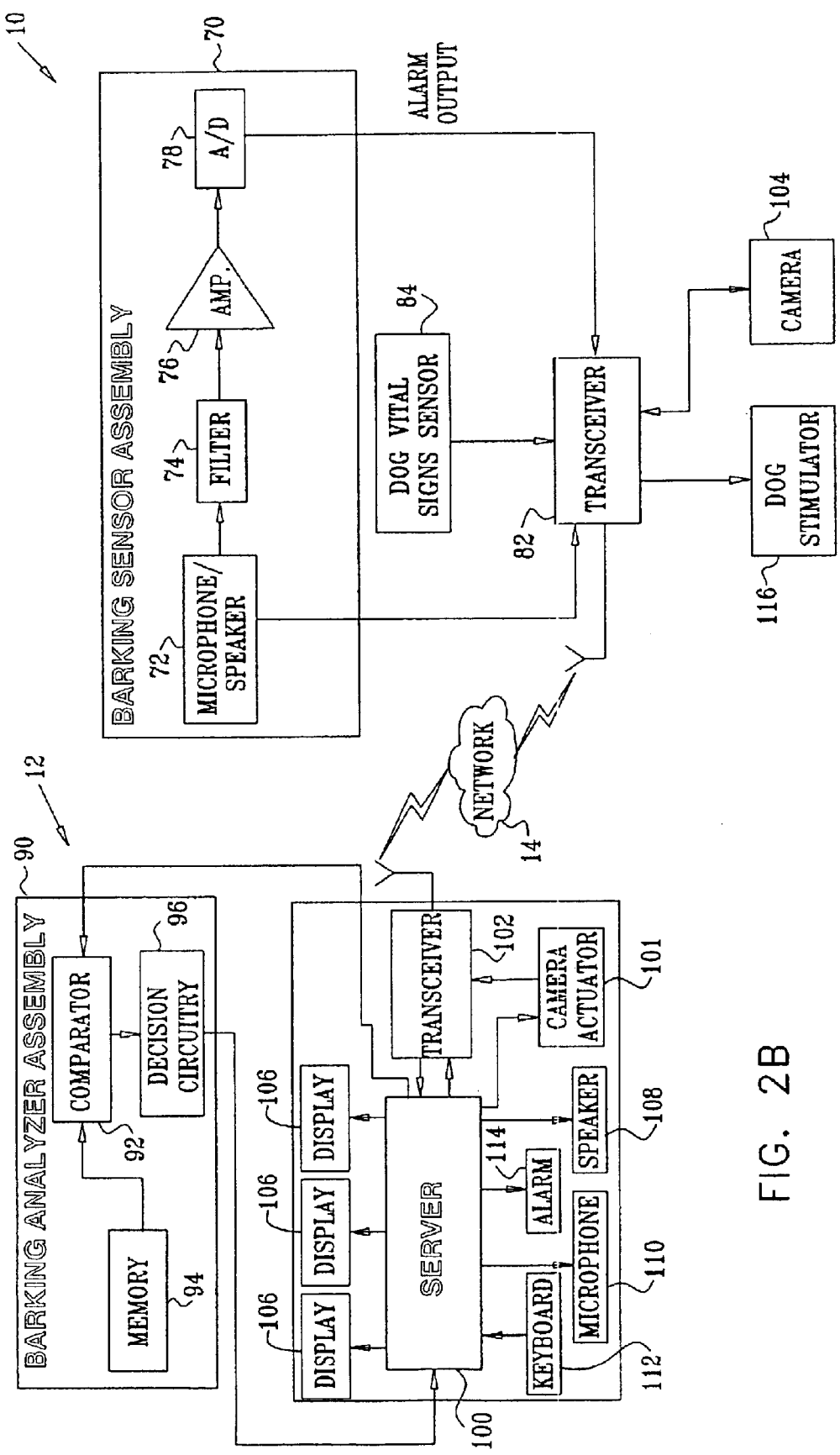
FIG. 2B is a simplified block diagram of the system of FIGS. 1A, 1B and 1C, constructed and operative in accordance with another embodiment of the present invention.

Referring now to FIG. 2B, it is seen that an alternative embodiment of the dog mounted surveillance apparatus 10 preferably comprises a barking sensor assembly 70, typically comprising a microphone/speaker 72, which outputs via a filter 74 to an amplifier 76 and thence preferably to a analog to digital converter 78. Barking sensor 70 preferably is operative to sense sound in the frequency range of 10–90 KHZ. The barking sensor assembly 70 preferably outputs to a transceiver 82 which wirelessly transmits the sensed output signal to remote monitoring station 12 (FIG. 1A). Transceiver 82 also preferably transmits signals received from a dog vital signs sensor 84 such as a heartbeat sensor, which could indicate that the dog is in a state of extreme agitation or dead.

In this embodiment, the remote monitoring station 12 preferably includes a barking analyzer assembly 90, similar to barking analyzer assembly 30 (FIG. 2A), which preferably receives the output from the barking sensor assembly 70 and compares it with stored barking patterns characteristic of the dog when in an alarm state.

Barking analyzer assembly 90 preferably comprises digital comparison circuitry, here indicated as comparator 92, which compares multiple samples of barking sound outputs from barking sensor assembly 70 with the barking sound patterns characteristic of an alarm situation, stored in a memory 94 and digital decision circuitry 96 which analyzes the result of the comparison and provides an alarm output when at least a predetermined number of samples meet an alarm criteria, preferably by virtue of being matched with stored amplitude and frequency patterns known to be characteristic of barking of the dog when in a threatening situation.

The barking analyzer assembly may be embodied in a conventional server 100 forming part of the remote monitoring station 12, which analyzes multiple samples of barking sound outputs received from barking sensor assembly 70 and provides an alarm output when at least a predetermined number of samples meet an alarm criteria, preferably by virtue of being matched with stored amplitude and frequency patterns known to be characteristic of barking of the dog when in a threatening situation.

It is appreciated that in a preferred embodiment of the present invention, the alarm criteria are individual dog specific and require recording of barks of each specific dog in a learning/training mode. Alternatively, alarm criteria which are not individual dog specific may be employed. As a further alternative, alarm criteria may be provided for animals other than dogs, such as cats or other animals.

The remote monitoring station 12 preferably comprises, in addition to at least one server 100, a transceiver 102, which communicates with transceiver 82 and receives the output of the barking sensor assembly 70 and transmits it, via server 100 to the barking analyzer assembly 90. The output of barking sensor assembly 70 is supplied to server 100 which may drive a camera actuator 101 to provide a camera actuation output via transceivers 102 and 82 to a dog mounted camera 104.

In the embodiment of FIG. 2B, remote monitoring station 12 also typically comprises one or more video displays 106 showing a scene as imaged by video camera 104 as well as communication apparatus, typically including at least one speaker 108, at least one microphone 110 and at least one keyboard 112. The communication apparatus enables personnel at the remote monitoring station to speak or send messages to persons at a site protected by the system of the present invention, as illustrated in FIG. 1B and FIG. 1C. The remote monitoring station 12 also preferably includes an alarm annunciator 114, which may operate in an audio, visual or combined audio-visual mode, for indicating the existence of an alarm situation to personnel at the remote monitoring station.

In accordance with an embodiment of the present invention, the remote monitoring station 12 includes functionality for enabling personnel at the remote monitoring station to send messages to the dog via the wireless network 14 and the transceivers 82 and 102. Such messages may be voice messages, playable through microphone/speaker 72, or electrical stimulation, which may be provided to the dog by one or more transducers, here termed a dog stimulator 116.

As described hereinabove with reference to FIGS. 1A–1C, it is seen that communication between transceiver 82 and the remote monitoring station 12 may be effected through any suitable wireless network 14, such as a cellular telephone network, using voice or SMS messaging for example, or via a wireless computer network, which may include the Internet.

It will be appreciated by persons skilled in the art that the present invention is not limited to what has been particularly shown and described hereinabove. Rather the scope of the present invention includes both combinations and subcombinations of the various features described hereinabove as well as modifications and variations thereof as would occur to a person of skill in the art upon reading the foregoing specification and which are not in the prior art.

What is claimed is:

1. A automated computer system for non-human animal-based surveillance comprising:
   a non-human animal-borne, non-human animal noise sensor; and
   a non-human animal noise analyzer operative to receive sensed non-human animal noises, to determine at least partially therefrom whether an alarm situation exists and to provide an alarm indication output.

2. A system for non-human animal-based surveillance according to claim 1 and also comprising a remote monitoring facility receiving said alarm indication output.

3. A system for non-human animal-based surveillance according to claim 2 and also comprising a nonhuman animal-borne camera.

4. A system for non-human animal-based surveillance according to claim 3 and wherein said camera is actuated in response to an output of said non-human animal noise analyzer.

5. A system for non-human animal-based surveillance according to claim 4 and wherein outputs of said camera are displayed at said remote monitoring facility.

6. A system for non-human animal-based surveillance according to claim 5 and wherein said system includes a non-human animal-borne portion and a remote monitoring facility and utilizes an at least partially wireless network for providing communication between said non-human animal-borne portion and said remote monitoring facility.

7. A system for non-human animal-based surveillance according to claim 6 and wherein said non-human animal is a dog and said non-human animal sounds are sounds of dog barking, at least one of whose frequency and amplitude indicates the existence of an alarm situation.

8. A system for non-human animal-based surveillance according to claim 2 and also comprising a non-human animal-borne wireless transceiver.

9. A system for non-human animal-based surveillance according to claim 8 and wherein said non-human animal-borne wireless transceiver transmits said alarm indication output to said remote monitoring facility.

10. A system for non-human animal-based surveillance according to claim 9 and wherein said non-human animal noise analyzer is operative in a sleep mode in the absence of non-human animal sounds meeting a wake-up threshold.

11. A system for non-human animal-based surveillance according to claim 2 and wherein said non-human animal noise analyzer is located at said remote monitoring facility.

12. A system for non-human animal-based surveillance according to claim 11 and also comprising a non-human animal-borne wireless transceiver.

13. A system for non-human animal-based surveillance according to claim 12 and wherein said non-human animal-borne wireless transceiver transmits sensed non-human animal sounds to said non-human animal noise analyzer at said remote monitoring facility.

14. A system for non-human animal-based surveillance according to claim 1 and wherein said non-human animal noise analyzer is non-human animal-borne.

15. A system for non-human animal-based surveillance according to claim 1 and also comprising a non-human animal vital signs sensor for providing a non-human animal vital signs output.

16. A system for non-human animal-based surveillance according to claim 15 and wherein said non-human animal vital signs output indicates the existence of an alarm situation.

17. A system for non-human animal-based surveillance according to claim 1 and also comprising a non-human animal stimulator for providing an operator triggered stimulus to a non-human animal.

18. A method for non-human animal-based surveillance comprising:
   sensing a non-human animal noise, using a non-human animal-borne sensor;
   receiving said non-human animal noise;
   analyzing said non-human animal noise to determine at least partially therefrom whether an alarm situation exists; and
   providing an alarm indication output.

19. A method for non-human animal-based surveillance according to claim 18 and also comprising transmitting said alarm indication output to a remote monitoring facility.

20. A method for non-human animal-based surveillance according to claim 19 and wherein said analyzing said non-human animal noise comprises analyzing said non-human animal noise using a non-human animal-borne noise analyzer.

21. A method for non-human animal-based surveillance according to claim 20 and wherein said transmitting comprises transmitting from a non-human animal wireless transceiver.

22. A method for non-human animal-based surveillance according to claim 21 and also comprising operating said noise analyzer in a sleep mode in the absence of non-human animal sounds meeting a wake-up threshold.

23. A method for non-human animal-based surveillance according to claim 22 and wherein said analyzing comprises analyzing at said remote monitoring facility.

24. A method for non-human animal-based surveillance according to claim 23 and also comprising transmitting sensed non-human animal sounds from said non-human animal-borne wireless transceiver to said remote monitoring facility.

25. A method for non-human animal-based surveillance according to claim 24 and also comprising actuating a camera in response to said alarm indication output of said analyzing said non-human animal noise.

26. A method for non-human animal-based surveillance according to claim 25 and also comprising displaying outputs of said camera at said remote monitoring facility.

27. A method for non-human animal-based surveillance according to claim 26 and also comprising providing a non-human animal vital signs output.

28. A method for non-human animal-based surveillance according to claim 27 and also comprising indicating the existence of an alarm situation based on said non-human animal vital signs output.

29. A method for non-human animal-based surveillance according to claim 28 and also comprising providing an operator triggered stimulus to a non-human animal.

30. A method for non-human animal-based surveillance according to claim 29 and also comprising utilizing an at least partially wireless network for providing communication between said non-human animal and said remote monitoring facility.

31. A method for non-human animal-based surveillance affording to claim 30 and wherein said non-human animal is a dog and said non-human animal sounds are sounds of dog barking, at least one of whose frequency and amplitude indicates the existence of an alarm situation.

* * * * *